United States Patent
Trubuil et al.

(10) Patent No.: US 12,442,808 B2
(45) Date of Patent: Oct. 14, 2025

(54) METHOD FOR INSPECTING, AS THEY PASS, EGGS PLACED IN CONTAINERS

(71) Applicant: EGG-CHICK AUTOMATED TECHNOLOGIES, Landivisiau (FR)

(72) Inventors: Laura Trubuil, Plouedern (FR); Devan Lharidon, Plouedern (FR)

(73) Assignee: EGG-CHICK AUTOMATED TECHNOLOGIES, Landivisiau (FR)

( * ) Notice: Subject to any disclaimer, the term of this patent is extended or adjusted under 35 U.S.C. 154(b) by 38 days.

(21) Appl. No.: 18/564,838

(22) PCT Filed: May 24, 2022

(86) PCT No.: PCT/FR2022/050985
§ 371 (c)(1),
(2) Date: Dec. 15, 2023

(87) PCT Pub. No.: WO2022/254123
PCT Pub. Date: Dec. 8, 2022

(65) Prior Publication Data
US 2024/0264136 A1 Aug. 8, 2024

(30) Foreign Application Priority Data

Jun. 1, 2021 (FR) ...................................... 2105779

(51) Int. Cl.
*G01N 33/08* (2006.01)
*A01K 43/00* (2006.01)
*G01N 21/95* (2006.01)

(52) U.S. Cl.
CPC ........... *G01N 33/085* (2013.01); *A01K 43/00* (2013.01); *G01N 21/951* (2013.01)

(58) Field of Classification Search
CPC .... G01N 33/085; G01N 21/951; G01N 21/95; A01K 43/00

(Continued)

(56) References Cited

U.S. PATENT DOCUMENTS

2003/0039388 A1* 2/2003 Ulrich ................ G01B 11/2518
382/145
2009/0201323 A1 8/2009 Robert et al.

FOREIGN PATENT DOCUMENTS

CN 110583530 A 12/2019

OTHER PUBLICATIONS

International Search Report and Written Opinion in PCT/FR2022/050985, 10 pages, with partial translation. Sep. 15, 2022.

* cited by examiner

*Primary Examiner* — Md M Rahman
(74) *Attorney, Agent, or Firm* — Heslin Rothenberg Farley & Mesiti P.C.

(57) ABSTRACT

The present invention relates to a method and apparatus for inspecting, as they pass, eggs placed in containers. According to the invention, during the movement of these containers (1) along a conveyor line, the following steps are carried out:
triggering a data acquisition cycle on each passage of a downstream end of a container (1) through a first position, which is determined by a first position sensor (6) placed along said conveyor line, upstream and downstream positions being considered with reference to the direction of movement of the containers; then
for a data acquisition cycle of a container (1), detecting the passage of said downstream end of said container (1) through at least a second position determined by a second position sensor (7-8) placed along said conveyor line, a signal triggering thermal image acquisition being sent to a thermal camera (5) each time said downstream end of said container (1) is detected at at least a second position in order to trigger capture of one or more thermal images by said thermal camera (5) of the portion of the container (1) then placed in its field of view, (Continued)

said second position sensors (7-8) being arranged with respect to one other to ensure an inspection of all of the eggs of the container (1) considered by said thermal camera (5) when a plurality of second sensors are employed.

Furthermore, the data acquisition cycle of said container comprises performing, in a third position separate from said first and second positions, a step of candling the eggs placed in said container, in which step a light flux is emitted in the direction of at least one egg to be candled and the light flux passed through each corresponding egg is then analysed depending on the level of light flux absorbed by the egg, and said data thus acquired on the eggs of a container (1) are associated with a unique identifier of this container (1).

15 Claims, 1 Drawing Sheet

(58) Field of Classification Search
USPC .......................................................... 356/52
See application file for complete search history.

[Fig. 1]
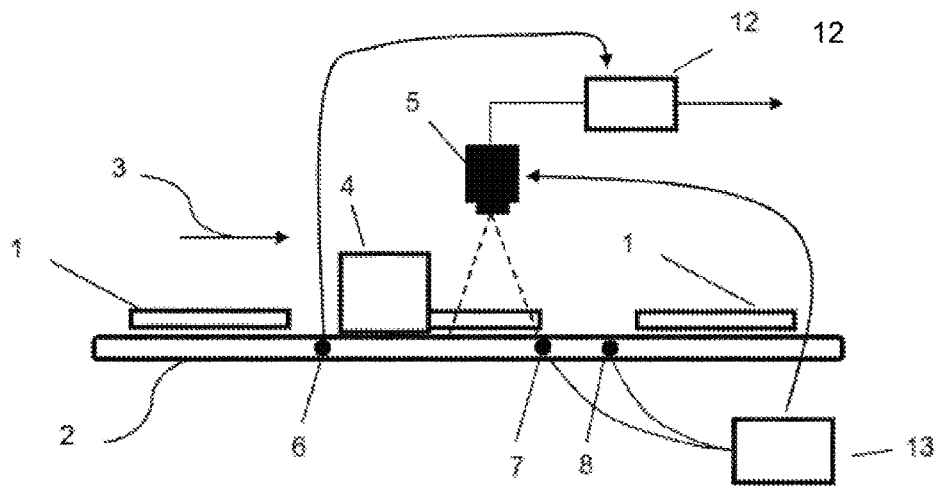
[Fig. 2]
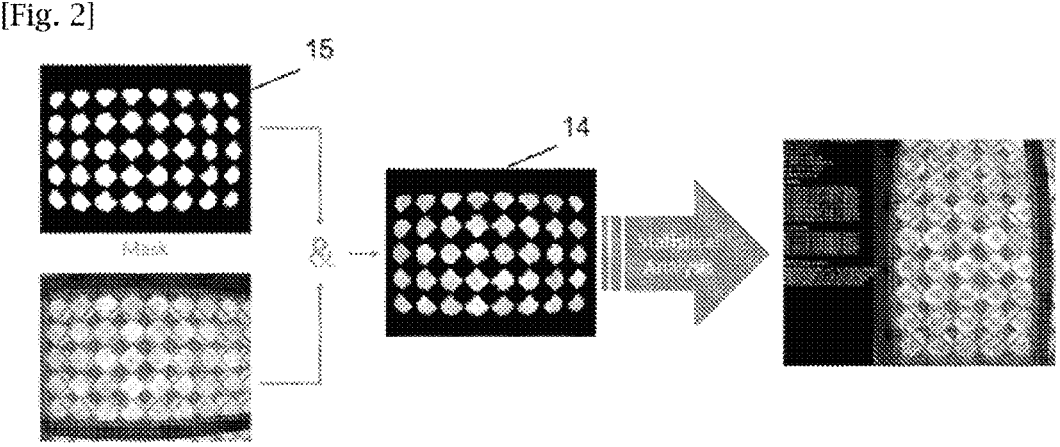
[Fig. 3]
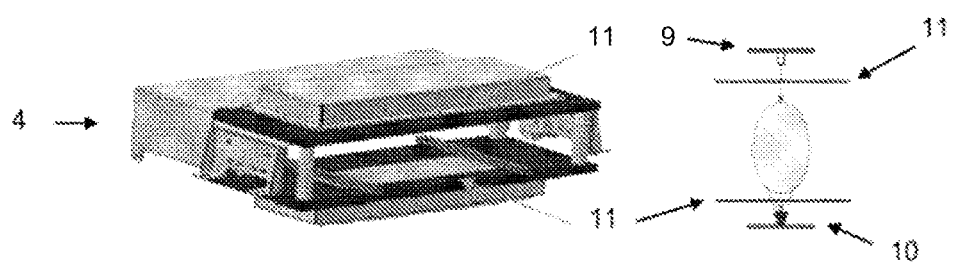

METHOD FOR INSPECTING, AS THEY PASS, EGGS PLACED IN CONTAINERS

CROSS REFERENCE TO RELATED APPLICATIONS

This application is a U.S. National Phase filing under 35 U.S.C. § 371 of International Application PCT/FR2022/050985, filed May 24, 2022, and published as WO 2022/254123 A1 on Dec. 8, 2022. PCT/FR2022/050985 claims priority from France application number 2105779, filed Jun. 1, 2021. The entire contents of each of these prior applications are hereby incorporated herein by reference.

TECHNICAL FIELD

The present invention relates to a method for inspecting, as they pass, eggs placed in containers, in particular for the automatic inspection of these eggs on a high-throughput treatment line.

It also relates to an apparatus for implementing such an inspection method.

PRIOR ART

It is known in the field of poultry farming, in particular in chick production, to use the optical properties of the eggs to differentiate between them and bypass during processing the eggs identified as being unlikely to hatch and produce a chick.

The latter are essentially infertile eggs or fertilized eggs but whose egg embryo is dead or else malformed.

This differentiation is made necessary not only to minimize the losses of vaccines during in ovo treatment, that is during injection by vaccine needle through the shell of the egg in order to promote its hatching and not only to prevent the appearance of diseases, but also to prevent the explosion of rotten eggs that are likely to contaminate surrounding viable eggs in the container, and the injection equipment that can be used to inject these viable eggs, which would also risk contaminating the latter.

Note that the explosion of rotten eggs is also likely to cause a mess on the optical protection screens used in egg differentiation, the method associated therewith commonly being called "candling".

The mess resulting from these explosions can be detrimental to the quality of detecting the state of certain eggs when they remain light, or even prevent such detection if the mess is greater. The machine used to perform the candling, referred to as a candling machine, must therefore be stopped to ensure its cleaning.

It is also known that certain steps of inspecting the eggs of a container are possible only when the container is stopped and/or at a low treatment throughput.

Such stopping of the conveyor-driven container is commonly achieved by introducing a mechanical blocker on the travel path thereof, or by simply stopping the conveyor.

However, it is observed that an abrupt stop of a container leads to an abrupt movement of the eggs in their cups, or divots, which leads to the eggs becoming misaligned, to a separation of each egg relative to the vertical passing through the center of its corresponding divot.

This misalignment of the eggs is of course detrimental to the subsequent injection of a vaccine in ovo, the needle of the injector then no longer being directed toward the air chamber of the corresponding egg.

Not only could the efficacy of vaccination be affected, but the embryo also risks being killed.

Such a stoppage also causes the application of sudden variations in speed and possibly of impacts on the embryos, which may have negative impacts on their viability.

In addition, the stopping of each container necessarily limits the maximum throughput that the associated treatment line can achieve.

The rates observed with these machines of the prior art consequently remain low.

There is therefore a pressing requirement for a method for inspecting eggs placed in container divots, the original design of which makes it possible to overcome the disadvantages of the prior art described above.

SUBJECT MATTER OF THE INVENTION

The present invention aims to overcome the disadvantages of the prior art by proposing a method and apparatus for inspecting eggs placed in containers, simple in design and in operating mode, allowing continuous passage of the containers, that is without stopping them.

Another object of the present invention is such a method and apparatus allowing extremely fast rates, and by way of illustration, of more than 90,000 eggs per hour.

Yet another subject matter of the present invention is such an inspection method and apparatus that is safer for the embryos of the eggs, and consequently, promoting the hatching of these eggs.

Yet another subject matter of the present invention is such an inspection method and apparatus that preserves the orientation of the eggs in their divots for a better-quality subsequent in-ovo injection.

DISCLOSURE OF THE INVENTION

To this end, the invention relates to a contactless method for inspecting, as they pass, eggs placed in containers. According to the invention, during the movement of these containers along a conveyor line, said containers being spaced apart from each other by at least a minimum separation distance d, the following steps are carried out:

triggering a data acquisition cycle on each passage of a downstream end of a container through a first position, which is determined by a first position sensor placed along said conveyor line, upstream and downstream positions being considered with reference to the direction of movement of the containers; then for a data acquisition cycle of a container, detecting the passage of said downstream end of said container through at least a second position determined by a second position sensor placed along said conveyor line, a signal triggering thermal image acquisition being sent to a thermal camera each time said downstream end of said container is detected at at least one second position in order to trigger capture of one or more thermal images by said thermal camera of the portion of the container then placed in its field of view, said second position sensors being arranged with respect to one other to ensure an inspection of all of the eggs of the container considered by said thermal camera when a plurality of second sensors are employed, during the data acquisition cycle of said container, a step of candling the eggs placed in said container is also carried out in a third position separate from said first and second positions, in which a light flux is emitted in the direction of at least one egg to be candled and the light flux passed through each corresponding egg is then analyzed depending on the level of light flux absorbed by the egg, and said data thus acquired on the eggs of a container are associated with a unique identifier of this container.

The original design of this method for inspecting eggs as they pass allows for extremely rapid throughputs, typically greater than 90,000 eggs per hour or more, while being safer for the eggs.

It is noted in fact that the eggs are subjected to less movements, less shocks, and are consequently better positioned in their respective divots for subsequent injection.

Furthermore, this method advantageously guarantees a one-by-one inspection of the moving containers so that the collected images and light signals can only be assigned to one container at a time. This method therefore proves to be more reliable in processing of the data at high throughput.

For each position sensor, the rising edge of the measurement signal linked to the detection of the passage of the downstream end of the container is detected in line with that sensor. Of course, the falling edge of the measurement signal could just as well be detected.

Although a single thermal camera is preferred, the present method could, of course, implement several thermal cameras, the field of view of which would for example be outside a dimension of a container, such as its width.

According to one embodiment of this method for inspecting, as they pass, eggs placed in containers, this candling step is carried out:

either at an instant $t_1$ from the detection of the downstream end of said container at said first position, $t_1$ being less than the time required for the downstream end of said container to reach said at least one second position, or by the detection of said downstream end of said container by a third position sensor placed between said first position sensor and said at least one second position sensor along said container conveyor line.

Alternatively, this candling step is triggered by the detection of the passage of said downstream end of said container in a third position determined by a third position sensor placed downstream on the one hand of the first position sensor and on the other hand of said second position sensor(s), along said conveyor line.

As an example, this candling step comprises focusing a light beam on each egg and detecting the light that passed through each corresponding egg.

The light sources used to emit the light beams are advantageously lasers, and even better light-emitting diodes (LEDs) emitting in the infrared.

Preferably, the detected light is automatically processed and the data obtained from this processing is used to process the image(s) obtained by the thermal camera Thus, and advantageously, the eggs being positioned in rows in divots in each container, it is determined by processing the signals obtained during said candling step, which are the empty divot(s) of the container, and the coordinates of the locations of said empty divot(s) in said container are saved in memory.

Preferably, the presence of one or more empty divots in the container thus measured is considered during the treatment of the thermal image(s) acquired by said thermal camera. A suitable software application, or computer program, makes it possible, when executed by a processor, to process the thermal image(s) thus acquired by the thermal camera to deduce therefrom, from the calculated temperature of each egg, information on the eggs contained in the container. The detection of empty divots in the container advantageously contributes to improving the statistical treatment of the temperatures and therefore to refine and thus make the information obtained for each egg present in the container more reliable.

According to another embodiment of this method for inspecting, as they pass, eggs placed in containers, during said step of candling the eggs contained in said container, it is determined by means of a position sensor, the length of said container being measured, the thus measured length of said container is compared with its real length and the absence or existence of an inadvertent movement of said container during the candling step is deduced therefrom.

Advantageously, the original design of this step allows simple and inexpensive detection of an inadvertent movement of a container transported by a conveyor, this movement resulting in a loss of its exact position on the conveyor during an optical measurement of the eggs thereby transported.

This detection step allows extremely rapid throughput, typically greater than 90,000 eggs per hour, while strengthening the reliability of the candling measurements carried out.

Preferably, this position sensor being arranged to detect the front and rear ends of a container moving along said conveyor line, the time interval separating the detection by this sensor of said ends is measured, and a measured length of the container is calculated by the product of this time interval multiplied by the driving speed of that container along said treatment line.

Advantageously, this position sensor is arranged to detect those ends of a container when they pass right next to that sensor during the transport of the container along the treatment line.

Alternatively, this position sensor being arranged to detect the front and rear ends of a container moving along said conveyor line, the number of encoder points elapsed between the detection of these front and rear ends by said sensor is determined, and this number of encoder points is converted into the measured length of said container.

As the distance traveled by the belt of the conveyor during an encoder run is known, the number of encoder points thus determined can easily be translated or converted into a distance.

Recall that the number of encoder points per encoder is linked to the resolution of this encoder. The encoder advantageously emits an electrical signal giving the number of encoder points produced between the detection of the two front and rear ends.

Advantageously, this measurement of the length of the container is thus independent of the drive speed of the conveyor.

During the comparison step, it is also possible to take into account a previously determined tolerance range over the measured length of the container.

According to yet another embodiment of this method for inspecting, as they pass, eggs placed in containers, the light signal that passed through each egg thus detected is also treated to determine the presence of grime on the light emitters, or the protective screens of these emitters/receivers, and if any is present, to send an alarm signal.

Advantageously, before the measurement of a new container, a measurement of the cleanliness of their transparent protective screen at very low intensity is carried out with the infrared transmitters/receivers.

It could also be envisaged to perform an automatic detection of the presence of grime on the optical system of the thermal camera. Such detection would be carried out by processing at least one image acquired by this thermal camera by means of appropriate software.

According to one embodiment of this method for detecting the presence of grime on the optical system of the thermal camera, one or more images are acquired with the thermal camera and each image is compared with reference images corresponding to an optical system considered to be clean, these reference images being stored in a storage unit. If this comparison reveals differences that are too large, the corresponding image is considered to be unreliable and an alarm signal is sent to the operator to perform an intervention on the thermal camera.

It would also be possible to carry out a step of detecting light pollution prior to a step of candling a basket. In this step, a "blank" measurement (emitters switched off) would be carried out in order to verify whether the receivers are receiving a signal or not. If such a signal is obtained while the IR emitters are switched off, it is because another IR source at 850 nm is present and likely to disrupt the measurements obtained during the step of candling the eggs contained in a basket. Advantageously, an alarm signal is sent to the operator.

Examples of light sources emitting at 850 nm that would be likely to disrupt the measurements during the candling step: Halogen lamp, sunlight, etc.

These systematic control measurements make it possible to verify the presence in particular of grime before any measurement of a new container.

According to yet another embodiment of this method for inspecting, as they pass, eggs placed in containers, the acquisition of the data and the processing of these data are carried out in parallel so that the processing of the image or of the thermal images obtained for a first container is carried out while one or more thermal images of a subsequent container are being acquired.

Advantageously, such parallel processing allows higher throughput for a given distance and speed of travel of the containers.

According to yet another embodiment of this method for inspecting, as they pass, eggs placed in containers, one or more images related to a given container are processed, the information obtained by this processing being stored in and/or sent to a remote egg treatment station such as a device for delivering in-ovo injection of eggs, so that this treatment station receiving said container of eggs to be treated has information necessary for its treatment.

This thus ensures continuity in the processing of each container, the next processing station on the high-throughput processing line having already received from the inspection apparatus, the information relating to the container to be treated before it is taken in.

According to yet another embodiment of this method for inspecting, as they pass, eggs placed in containers, said containers are transported at a constant speed V by a straight conveyor.

Insofar as each container moves in translation, in particular at a constant speed on a straight conveyor, which, at a high throughput, has the advantage of avoiding jerking, the eggs remain stable in their respective divots of the container and consequently have optimal positioning for their subsequent injection.

By way of example, this is an endless belt conveyor.

According to yet another embodiment of this method for inspecting, as they pass, eggs placed in containers, said containers are transported at a speed strictly greater than or equal to 0.11 m/s, and even better still at 0.3 m/s, being spaced apart by a safety distance at least equal to d=100 mm to ensure a high treatment throughput.

According to yet another embodiment of this method for inspecting, as they pass, eggs placed in containers, each container is arranged on said straight conveyor so that its downstream end is perpendicular or substantially perpendicular to the lateral edge of the straight conveyor, a dimension of the detection matrix of the thermal camera being aligned with this perpendicular direction.

According to yet another embodiment of this method for inspecting, as they pass, eggs placed in containers, from the data thus acquired from the eggs contained in said container, a state of each fertilized egg containing an embryo is determined.

It is then sought to determine, for each fertilized egg comprising an embryo, whether that embryo is living or dead, or whether it is malformed or too small for its age.

Such a state then being detected, the corresponding egg will advantageously be ignored in the rest of the treatment of the container, in particular in the injection of this egg.

The present invention also relates to an inspection apparatus for implementing various methods for inspecting, as they pass, eggs placed in divots of containers, and in particular the as-they-pass inspection method as described above.

According to the invention, this inspection apparatus comprises:
   a straight conveyor for transporting containers of eggs and determining an axis of movement of these containers,
   at least one thermal camera placed fixedly along the axis of movement of the containers, said at least one thermal camera being configured to acquire at least one thermal image triggered by an external signal,
   a first position sensor placed upstream of the field of view of said at least one thermal camera and connected to a central processing unit of the inspection apparatus so as to initiate a data acquisition cycle for an egg container whose downstream end is detected in a first position defined by said first sensor,
   one or more second position sensors placed downstream of this first sensor, said second sensor or said second sensors being connected to said at least one thermal camera or to a control unit of said at least one thermal camera to send a signal triggering image acquisition to said or at least one of said thermal cameras when the downstream end of the container is detected in a second position defined by that or any of those second position sensors,
   a plurality of light sources for each focus of a light beam in an egg to be candled in a container, detectors for each receiving the light passing through an egg thus illuminated and a processing unit for processing the light signal thus detected by each detector, and
   said central processing unit being configured to process each of the images acquired by said at least one thermal camera.

Such an apparatus advantageously allows contactless inspection, as they pass, of eggs arranged in a container, or basket, while being safer for the embryos of the eggs.

This apparatus is particularly suitable for the high-throughput treatment of objects on an industrial automatic line for treating objects having fragile content.

It advantageously allows high automatic processing rates typically greater than 90,000 eggs per hour, or even greater than 130,000 eggs per hour.

The central processing unit of this apparatus is also configured to authorize a parallel processing of the images acquired for a first container while the thermal camera acquires images for a second container.

Advantageously, this inspection apparatus comprises a control unit inspecting the transport speed of the containers by the conveyor, which is configured to define a constant transport speed of the containers along a conveying path. More generally, the movement of the containers on the straight conveyor is carried out without jerking.

The containers being in constant-speed movement ensures in particular the stability of the eggs in their divots and consequently, an optimal orientation of these eggs for their subsequent treatment on other stations of a high-speed treatment line.

Preferably, said at least one thermal camera is configured so that its field of view covers all of the divots of the container along at least one first direction thereof.

Advantageously, this direction is transverse to the axis of movement of the containers. The containers thus driven by the conveyor are spaced apart by a distance d such that the field of view of the thermal camera covers a whole number of divots along a second direction of the container, said second direction being perpendicular to the first direction of the container.

Preferably, the position sensors are photoelectric divots that are, for example, placed above the conveyor belt.

Advantageously, these light sources are laser sources equipped with focusing means to form a concentrated optical beam in their respective egg. Purely by way of illustration, it may be laser diodes (LED) emitting in the infrared.

Preferably, these light sources are arranged to form at least one row arranged transversely to the direction of movement of the conveyor-driven containers so as to each emit an optical beam toward a corresponding egg of a same row of a container.

These elements are placed upstream of the field of view of the thermal camera along the axis of movement of the containers.

Preferably, this plurality of light sources and these detectors are placed between the first position sensor and said at least one second position sensor.

Alternatively, said plurality of light sources and said detectors are placed downstream of said first position sensor and said at least one second position sensor.

This apparatus may also comprise a communication module for sending data or information obtained by processing the image(s) of a given container to a remote station such as an in-ovo injection device of the eggs of this container.

BRIEF DESCRIPTION OF THE DRAWINGS

Other advantages, aims and particular features of the present invention will become apparent from the following description, made, for explanatory purposes and in no way limiting, with reference to the appended drawings, in which:

FIG. 1 is a partial schematic representation of an apparatus for inspecting, as they pass, eggs arranged in moving baskets according to a particular embodiment of the present invention;

FIG. 2 shows an example of data processing of an image acquired with the thermal camera of the apparatus of FIG. 1;

FIG. 3 is a perspective view of the candling device of the inspection apparatus of FIG. 1;

DESCRIPTION OF EMBODIMENTS

The drawings and the following description essentially contain elements of a certain nature. They may therefore not only serve to better understand the present invention, but also contribute to its definition, where appropriate.

First, it should be noted that the figures are not to scale.

FIGS. 1 to 3 schematically show an apparatus for inspecting, as they pass, eggs arranged in moving baskets 1 in a particular embodiment of the present invention This apparatus comprises a straight conveyor 2 for transporting baskets 1 along a conveying path defining an axis of movement 3 of these baskets 1.

This straight conveyor 2, which is of the endless belt type, comprises a control unit (not shown) controlling the transport speed of the baskets 1.

Advantageously, these baskets 1 are moving at constant speed to avoid causing jerking that is likely to cause the eggs to move around and/or cause impacts to the embryos of these eggs.

These baskets 1 running, which have a general "rectangular" shape, comprise a plurality of divots, or cells, in each of which an egg is normally received.

These eggs are preferably oriented in their divot for their injection in-ovo, that is that their narrowest end is arranged downward so that the air chamber is arranged upward. The risks of the injection needle damaging the embryo of the egg are thus reduced. The egg is preferably oriented vertically in its divot.

The baskets 1 are supplied on the straight conveyor 2 at a regular minimum intervals by being aligned in a row. They thus have minimum spacing between them.

Along the conveying path defined by the straight conveyor 2 are arranged in a fixed manner, a candling device 4, a thermal camera 5 and a plurality of position sensors 6-8.

The candling device 4 comprises emitters 9 and receivers 10 arranged to ensure the inspection of the same row of eggs of a basket 1. These emitters 9 and receivers 10 are placed in line transversely to the direction of advance of the baskets 1. Each emitter 9 is formed of a light-emitting diode (LED) emitting at a wavelength of 850 nm. Each receiver 10 is an infrared receiver, which advantageously has a band-pass filter centered around the wavelength of interest here, 850 nm.

In a known manner, these emitters 9 and receivers 10 are protected from spattering and waste that could drop the baskets 1 by protective screens 11 which are transparent for the wavelength considered.

For each egg to be candled, a transmitter 9 and a receiver 10 are arranged opposite each other, the emitter 9 being placed above the egg while the receiver 10 is placed under the egg to receive the light passing through an egg illuminated by the corresponding emitter 9. This candling device 4 also comprises a processing unit (not shown) for processing the light signal thus detected by each receiver 10.

This candling device 4 is used to determine the absent eggs in each basket 1 and to perform the detection of non-fertilized eggs. It is an advantage relative to the acquisition of only thermal images that do not make it possible to differentiate non-fertilized eggs from dead fertile eggs.

A first position sensor 6 is placed upstream of the field of view of the thermal camera 5 and is connected to a central unit 12 so as to launch an image acquisition cycle for each basket 1 whose downstream end is detected in a position along the axis of movement defined by this first sensor 6.

This ensures that the data that will be acquired by virtue of the candling device 4 and thermal camera 5 will be correctly assigned to the corresponding basket 1, to which a unique identifier is attached enabling its identification.

The field of view of the thermal camera 5 advantageously covers the width of the conveyor belt of the straight conveyor 2. This thermal camera 5 with a low response time makes it possible, through its lens, to form an instantaneous real image of the portion of the basket placed in its field of view on an array of photoelectric cells. This thermal camera 5 is configured to acquire an image triggered by an external signal ("triggered mode").

These external signals are transmitted by an electronic control board 12, here connected to two second position sensors 7-8 placed downstream of the first position sensor 6 along the conveying path. These second position sensors 7-8 are spaced apart from each other by a distance d substantially equal to half the length of the basket to be imaged.

For longer containers, it may be necessary to have three (3) position sensors downstream of the first position sensor 6 along the conveying path. These second position sensors are then spaced apart from each other by a distance d substantially equal to one-third the length of the basket to be imaged.

Thus, a basket 1 is integrally imaged in two stages by the thermal camera 5.

When the downstream end of the basket 1 during the acquisition cycle is detected in a position along the conveying path defined by one of these second position sensors 7-8, a trigger signal is instantaneously emitted by the electronic board 13 to the thermal camera 5 to perform a thermal image capture. The detection of the downstream end of the basket 1 by one of the second position sensors 7-8 results in a rising edge at the second corresponding position sensor, which triggers the sending of the signal to the thermal camera 5.

The central unit 12 also comprises a processing unit for processing each of the images acquired by the thermal camera 5. Advantageously, this central unit 12 is configured to authorize a parallel processing of the images acquired for a first basket 1 while the thermal camera 5 is acquiring images for a next basket 1.

The combination of a thermal camera 5 configured to acquire an image following the reception of an external triggering signal ("triggered mode") and a processing of the images acquired by that camera for a first basket 1 while new images are being acquired for a next basket 1 advantageously allows high egg inspection rates, much greater than 90,000 eggs per hour.

FIG. 2 shows an example of thermal image processing carried out by the processing unit of the central unit 12.

On each image acquired by the thermal camera 5 for a basket 1 during the acquisition cycle, a corrected image 14 of the eggs alone is generated by applying a mask 15 making it possible to isolate those eggs from the body of the basket 1 or to eliminate, from the raw thermal image, the signal linked to that basket 1.

The position of each egg in that basket 1 is thus identified, and a statistical analysis of the surface temperature and/or of the opacity of each of these eggs can be carried out.

The data obtained by the candling device 4 are used to take into account the signals related to locations of the basket 1 which are empty in order to improve the reliability of the calculations.

The invention claimed is:

1. A method for inspecting, as they pass, eggs placed in containers, characterized in that
    during the movement of these containers (1) along a conveyor line, said containers being spaced apart from each other by at least a minimum separation distance d, the following steps are carried out:
    triggering a data acquisition cycle on each passage of a downstream end of a container (1) through a first position, which is determined by a first position sensor (6) placed along said conveyor line, upstream and downstream positions being considered with reference to the direction of movement of the containers, then
    for the data acquisition cycle of the container (1), detecting the passage of said downstream end of said container (1) through at least a second position determined by a second position sensor (7-8) placed along said conveyor line, a signal triggering thermal image acquisition being sent to a thermal camera (5) each time said downstream end of said container (1) is detected at at least one second position in order to trigger capture of one or more thermal images by said thermal camera (5) of the portion of the container (1) then placed in its field of view,
    said second position sensors (7-8) being arranged with respect to one other to ensure an inspection of all of the eggs of the container (1) considered by said thermal camera (5) when a plurality of second sensors are employed,
    during the data acquisition cycle of said container, a step of candling the eggs placed in said container is also carried out in a third position separate from said first and second positions, in which a light flux is emitted in the direction of at least one egg to be candled and the light flux passed through each corresponding egg is then analyzed depending on the level of light flux absorbed by the egg, and
    said data thus acquired on the eggs of a container (1) are associated with a unique identifier of this container (1).

2. The method according to claim 1, characterized in that said candling step is carried out either at an instant $t_1$ from the detection of the downstream end of said container (1) at said first position, $t_1$ being less than the time required for the downstream end of said container to reach said at least one second position, or by the detection of said downstream end of said container by a third position sensor placed between said first position sensor and said at least one second position sensor along said container conveyor line.

3. The method according to claim 1, characterized in that said candling step is triggered by the detection of the passage of said downstream end of said container (1) in a third position determined by a third position sensor placed downstream of the first position sensor and of said at least one second position sensor, along said conveyor line.

4. The method according to claim 1, characterized in that the eggs being positioned in rows in divots within each container, it is determined by processing the signals obtained during said candling step, the empty divot(s) of said container (1) and the coordinates of the locations of said empty divot(s) in said container are saved in memory, the presence of one or more empty divots in said container thus measured being considered during the processing of the thermal image(s) acquired by said thermal camera (5).

5. The method according to claim 1, characterized in that during said step of candling the eggs contained in said container, it is determined by means of a single position sensor the length of said container being measured, the thus measured length of said container (1) is compared with its real length and the absence or existence of an inadvertent movement of said container during the candling step is deduced therefrom.

6. The method according to claim 5, characterized in that said position sensor being arranged to detect the front and rear ends of a container moving along said axis of movement, the time interval separating the detection by said sensor of said ends is measured and a measured length of the container is calculated by the product of this time interval multiplied by the driving speed of said container along said conveyor line.

7. The method according to claim 1, characterized in that the light signal that passed through each egg thus detected is also treated to determine the presence of grime on the light emitters, or the protective screens of these emitters/receivers, and if any is present, to send an alarm signal.

8. The method according to claim 1, characterized in that the acquisition of the data and the processing of these data are carried out in parallel so that the processing of the image or of the thermal images obtained for a first container (1) is carried out while one or more thermal images of a subsequent container (1) are being acquired.

9. The method according to claim 1, characterized in that said containers are transported at a constant speed V by a straight conveyor.

10. The method according to claim 1, characterized in that from the data thus acquired from the eggs contained in said container (1), a state of each fertilized egg containing an embryo is determined.

11. An apparatus for inspecting, as they pass, eggs placed in containers, characterized in that it comprises:
- a straight conveyor for transporting containers of eggs and determining an axis of movement of these containers,
- at least one thermal camera (5) placed fixedly along the axis of movement of the containers, said at least one thermal camera (5) being configured to acquire at least one thermal image triggered by an external signal,
- a first position sensor (6) placed upstream of the field of view of said at least one thermal camera (5) and connected to a central processing unit (12) of the inspection apparatus so as to initiate a data acquisition cycle for an egg container (1) whose downstream end is detected in a first position defined by said first sensor,
- one or more second position sensors (7-8) placed downstream of this first sensor, said second sensor or said second sensors (7-8) being connected to said at least one thermal camera (5) or to a control unit of said at least one thermal camera to send a signal triggering image acquisition to said or at least one of said thermal cameras (5) when the downstream end of the container (1) is detected in a second position defined by that or any of those second position sensors (7-8),
- a plurality of light sources (9) for each focus of a light beam in an egg to be candled in a container (1), detectors (10) for each receiving the light passing through an egg thus illuminated and a processing unit for processing the light signal thus detected by each detector, and
- said central unit (12) being configured to process each of the images acquired by said at least one thermal camera (5).

12. The apparatus according to claim 11, characterized in that said at least one thermal camera (5) is configured so that its field of view covers all of the divots of the container (1) according to at least one first direction thereof.

13. The apparatus according to claim 11, characterized in that said position sensors (6-8) are photoelectric cells.

14. The apparatus according to claim 11, characterized in that said plurality of light sources and said detectors are placed between the first position sensor and said at least one second position sensor.

15. The apparatus according to claim 11, characterized in that said plurality of light sources and said detectors are placed downstream of said first position sensor and of said at least one second position sensor.

\* \* \* \* \*